3,788,833
PRODUCTION OF PALLADIUM-SILVER
ALLOY POWDER
Oliver A. Short, Wilmington, Del., assignor to E. I. du
Pont de Nemours and Company, Wilmington, Del.
No Drawing. Original application Mar. 29, 1971, Ser. No.
129,175, now abandoned. Divided and this application
Feb. 18, 1972, Ser. No. 227,685
Int. Cl. B22f 9/00; C22b 5/00
U.S. Cl. 75—.5 A
2 Claims

ABSTRACT OF THE DISCLOSURE

There is provided a method for producing solid solution palladium-silver alloys in finely-divided form by reducing particles of palladium silver carbonate in suspension in an aqueous medium.

---

This is a division of application Ser. No. 129,175, filed Mar. 29, 1971, now abandoned.

BACKGROUND OF THE INVENTION

Palladium-silver alloys in finely-divided form are particularly useful in forming electric-current conducting layers as in preparing electrodes for use in multi-layer ceramic capacitors and in other microcircuit applications. U.S. Pat. 3,390,981 relates to a method of producing noble metal alloys, including palladium-silver alloys, by reducing mixed palladium and silver nitrates in solution in an aqueous medium.

It is the principal object of the present invention to provide a novel method for preparing palladium-silver alloys.

It is another object of the present invention to provide a method for preparing palladium-silver alloys in the form of solid solution alloys.

It is still another object of the present invention to provide a method for producing solid solution palladium-silver alloys in very finely-divided form.

These and other objects will become apparent from a consideration of the following specification and claims.

The method of the present invention comprises providing a suspension, in aqueous medium, of finely-divided palladium silver carbonate and reducing the stated carbonate particles to their corresponding metallic form.

It has been found that suspended mixed crystals of palladium and silver carbonates can be reduced, in solid form, directly to metallic form and resulting in the formation of solid solution alloys of palladium and silver in which the proportion of palladium to silver in the alloy is equivalent to that in the starting carbonate.

As stated, the material subjected to reduction in accordance with the method of the present invention, is particles of mixed crystals of palladium and silver carbonates suspended in an aqueous medium. Generally, the suspension of carbonate particles is provided by coprecipitating the carbonates by adding an alkali metal carbonate to a chloride-free solution of soluble palladium and silver salts, such as the nitrates or acetates. One method for preparing the carbonate suspension involves first forming a chloride-free solution of palladium nitrate as by reacting palladium chloride, in aqueous solution, with an alkali metal carbonate to precipitate palladium carbonate; separating the precipitated palladium carbonate and washing it until free of chloride; and dissolving the chloride-free palladium carbonate in aqueous nitric acid to form a solution of palladium nitrate. Aqueous acetic acid may be used to form palladium acetate. Another method of forming a chloride-free solution of palladium nitrate is the subject matter of copending application Ser. No. 129,174, filed Mar. 29, 1971. In accordance with the method of that application palladium metal powder is dissolved in aqueous nitric acid in the presence of an oxidation catalyst, such as sodium nitrate, to catalyze the generation of oxides of nitrogen to solubilize the palladium. Once the chloride-free solution of palladium nitrate is provided, silver nitrate is mixed therewith to form an aqueous solution of the mixed palladium and silver nitrates in a ratio approximately equal to that of the alloy desired. If the palladium is in the form of the acetate, silver acetate would be used.

The mixed palladium and silver nitrate or acetate in solution is then coprecipitated as mixed crystal carbonates, and this may be accomplished simply by adding an alkali metal carbonate. The amount of soluble carbonate added will be at least that stoichiometrically equivalent to the palladium and silver values present, and preferably some excess of carbonate is added. While such excess may be as much as 50% in excess of that theoretically required, the excess normally does not exceed about 30%.

The soluble carbonate added to precipitate the palladium and silver as carbonate may be any alkali metal carbonate (including ammonium carbonate). Of these, the carbonate is most usually sodium carbonate or potassium carbonate, with sodium carbonate being preferred. The addition of the carbonate provides a pH of at least about 7. In the preferred embodiment where some excess carbonate is added, the pH is generally at least about 8 and may go as high as about 10.

The object of the foregoing is to provide a chloride-free suspension of finely-divided particles of a mixed palladium silver carbonate in a ratio approximately equal to that of the desired alloy.

The principal feature of the present invention is simultaneously reducing the suspended palladium and silver values, as the mixed crystal carbonate coprecipitate, to metallic form. The reducing agent employed for this purpose may vary widely, and may include a combination of different reducing agents, one favoring reduction of the palladium carbonate and the other favoring reduction of the silver carbonate. Examples of reducing agents are, for silver: sodium formate, ammonium formate, hydroxylamine, hydrazine sulfate and formaldehyde; and, for palladium: sodium borohydride, sodium hypophosphite, hydroquinone, hydrazine sulfate and formaldehyde. As will be apparent, formaldehyde and hydrazine sulfate are effective against both the palladium carbonate and the silver carbonate, and these represent the preferred reducing agents with formaldehyde being especially advantageous.

In carrying out the reduction, the reducing agent, which may or may not be dissolved in water depending upon its particular nature, is added to the mixed palladium-silver carbonate suspension, usually with some agitation. The temperature of the medium during reduction is not critical, and it may range from room temperature or below, even down to 0° C., up to about 80° C. or even up to the boiling point, depending primarily upon the particular reducing agent employed. During reduction, the solid palladium silver carbonate is converted directly to solid metal, in the form of a solid solution alloy.

The relative proportions of the palladium and silver in the alloy correspond approximately to that of the palladium and silver values in the mixed carbonate starting material. By the method of the present invention, any desired ratio of palladium to silver may be provided in the resulting alloy ranging from about 99% palladium and 1% of silver to about 1% of palladium and 99% of silver. In most cases, however, the alloy will contain a substantial proportion of each of the metals in which the range of ratios of palladium to silver may range from about 25% of palladium and about 75% of silver to about 75% of palladium and about 25% of silver.

The amount of reducing agent employed is at least that stoichiometrically equivalent to the palladium silver carbonate present. Preferably, however, some excess is employed, and the excess is not critical and may go up to about 50 or 100%.

The concentration of the carbonates in suspension in the aqueous medium at the time of reduction is not critical. The maximum concentration may be dictated by considerations of handling the suspension since it is preferably to work with a fluid suspension that can be stirred. The minimum concentration, on the other hand, may be dictated by the undesirability of treating and handling a large unnecessary excess of water.

The resulting alloy is readily recovered from the aqueous medium as by filtration or centrifuging, and it may be washed with water. It will, as stated, be in finely-divided form, and the particles will normally have an average diameter no greater than about 5 microns and may range down to about 0.01 micron or smaller. The mixed crystals of palladium silver carbonate from which the alloy is prepared will have a particle size which upon reduction, provides the desired particle size in the alloy.

This invention is illustrated by the following examples. In the examples and elsewhere in the specification, all parts, ratios and percentages of materials or components are by weight.

EXAMPLE 1

Into a 3 liter beaker are added 75.4 grams of an aqueous palladium chloride solution containing 20.12% of palladium and 500 ml. of distilled water. Into a second, 1.5 liter beaker are placed 31 grams of sodium carbonate and 500 ml. of distilled water. The contents of the second beaker are added to those of the first beaker, and the mixture is heated to 80° C. The beaker and its contents are allowed to stand to settle the precipitated palladium carbonate. The supernatent liquid is decanted and the palladium carbonate precipitate is washed with hot distilled water followed by decantation and further washing repeated until the palladium carbonate is free of chloride. The palladium carbonate is then repulped into 500 ml. of distilled water following which 150 cc. of concentrated nitric acid are added to dissolve the palladium carbonate as palladium nitrate. Silver nitrate crystals (23.5 g.) are dissolved in the palladium nitrate solution, and the mixture is heated to 80° C. Sufficient solid sodium carbonate is then added to provide a pH of 9 and a coprecipitate of silver palladium carbonate which is kept in suspension by agitation. Then, while maintaining the temperature of the slurry at 80° C., one pint of 37% aqueous formaldehyde is slowly added to reduce the mixed carbonate to palladium-silver alloy. The resulting alloy is filtered and washed with distilled water resulting in 30 grams of palladium-silver alloy (50:50) as a powder. X-ray examination of the powder shows no pattern for palladium or silver but a material of intermediate unit cell spacing.

EXAMPLE 2–5

The procedure of Example 1 is followed except that the proportions of palladium carbonate to silver carbonate in the carbonate suspension provides the following ratios of palladium to silver in the mixed carbonate and in the resulting alloy (2) 30:70; (3) 40:60; (4) 65:35; and (5) 75:25. The mixed carbonate suspension in each of these cases has a pH of 9.5–10, and the X-ray examination of the resulting alloy powders shows results similar to those found in Example 1.

EXAMPLE 6

The procedure of Example 1 is followed except that ½ pint of 37% aqueous formaldehyde solution is employed instead of 1 pint, and the results are essentially the same as those found in Example 1.

EXAMPLE 7

The procedure of Example 1 is followed except that just sufficient sodium carbonate is added to provide a pH of about 7. The results are essentially the same as that found in Example 1.

EXAMPLE 8

Into a 2 liter beaker are placed 150 ml. of concentrated nitric acid and 300 ml. of distilled water. Fifteen grams of palladium metal powder (about 7 m.$^2$/gram) are added to the solution, following which 0.5 gram of sodium nitrite are added. The mixture is agitated and heated to about 50° C. for 15–20 minutes at which time all the metal is in the solution. The resulting solution of palladium nitrate is then placed in a 4 liter beaker to which are added 550 ml. of distilled water and 23.5 grams of silver nitrate dissolved in 50 ml. of distilled water. The mixture is heated to 80° C. with stirring at which time 155 grams of solid sodium carbonate (0.3 mol of sodium carbonate in excess of that stoichiometrically required for the reaction) are added to provide a pH of 10 and the precipitation of the mixed palladium and silver carbonate.

Next, 500 ml. of 37% aqueous formaldehyde solution are added over a period of 20 minutes. During this addition the temperature rises up to about 89° C. Heating is discontinued and the precipitated alloy is permitted to settle following which the supernatent liquid is decanted off. The alloy is washed six times by decantation using about 1 liter of distilled water per washing.

The alloy was then placed on a Pyrex dish and dried overnight at 70° C. in a forced air dryer. The resulting powder was sieved through a 6 mesh screen, and the resulting material has a surface area of 45 m.$^2$/gram.

EXAMPLE 9

The procedure of Example 8 is followed except that 140 grams of solid sodium carbonate (0.15 mol excess sodium carbonate) are employed. The pH of the carbonate suspension is 8.35, and the surface area of the resulting alloy is 32 m.$^2$/gram.

EXAMPLE 10

The procedure of Example 8 is followed except that 124 grams of solid sodium carbonate (no excess) is employed and the pH is about 7.2. The surface area of the resulting alloy is 37 m.$^2$/gram.

EXAMPLE 11

The procedure of Example 9 is followed except that, after the addition of the sodium carbonate, the mixture is permitted to cool to 37° C. at which time the formaldehyde solution is added. During this addition the temperature rises slightly to a maximum of about 41° C. The surface area of the resulting alloy is 58 m.$^2$/gram.

EXAMPLE 12

The procedure of Example 11 is followed except that the formaldehyde solution is added initially with the mixture at a temperature of about 50° C., and the temperature rises to about 55° C. during the formaldehyde addition. The surface area of the resulting alloy is 54 m.$^2$/gram.

EXAMPLE 13

The procedure of Example 11 is followed except that the temperature of the mixture is 67° C. when formaldehyde addition is commenced, and the temperature rises to 71° C. during the formaldehyde addition. The surface area of the resulting alloy is 32 m.$^2$/gram.

EXAMPLE 14

The procedure of Example 8 is followed except that 18 g. of hydrazine sulfate in 225 ml. of distilled water is added, instead of formaldehyde, to the carbonate suspension over a period of 8 minutes. The temperature goes from about 34° C. to about 40° C. during this addition. The surface area of the resulting alloy is 44 m.²/gram.

The palladium-silver alloy powder of this invention can be used to prepare various metallizing compositions which may be used for decorative purposes, in printed circuits (e.g., conductors and resistors) and in other electronic applications. Such metallizing compositions may be readily formulated according to well-known procedures as are described in U.S. Pat. Nos. 3,413,240, 3,385,799 and 3,347,799, the disclosures of which are incorporated herein by reference. Of course, formulation of metallizing compositions will depend upon end use requirements. Such relevant factors as liquid vehicle composition, inorganic binder (e.g., glass frit), palladium-silver alloy content, the proportions of each component and firing conditions will be determinable by a skilled artisan. A useful metallizing composition is described in Example 15.

EXAMPLE 15

A metallizing composition was prepared from the palladium-silver alloy powder of Example 8. The composition contained 84% palladium-silver alloy, 2% of a finely divided lead-borate glass frit (83% PbO and 17% $B_2O_3$), and 14% of a liquid vehicle consisting of 10% ethyl cellulose and 90% beta terpineol. This metallizing composition, which was printed and fired using ordinary techniques, produced adherent conductive elements which exhibited good electrical properties.

What is claimed is:

1. In a method of producing a solid-solution palladium-silver alloy, said solid-solution alloy consisting of finely-divided powder having an average diameter of no greater than about 5 microns, and said alloy having an intermediate unit cell spacing between that of silver and palladium metals, the improvement consisting essentially of
   coprecipitating palladium-silver mixed crystal carbonate particles from a chloride-free solution of palladium and silver salts,
   suspending said mixed carbonate particles in an aqueous medium, said aqueous medium having a pH of at least 7, and
   simultaneously reducing to metallic form said mixed crystal carbonate particles of palladium silver carbonate suspended in an aqueous medium by adding an aqueous solution selected from the group consisting of aqueous hydrazine sulfate and aqueous formaldehyde.

2. The method of claim 1 wherein the pH of the carbonate suspension is from about 8 to about 10.

References Cited
UNITED STATES PATENTS

| | | | |
|---|---|---|---|
| 3,390,981 | 7/1968 | Hoffman | 75—.5 A |
| 3,427,153 | 2/1969 | Venkatesan et al. | 75—108 |
| 3,501,287 | 3/1970 | Lever | 75—108 X |
| 2,254,976 | 9/1941 | Powell | 75—.5 A |
| 3,655,363 | 4/1972 | Tsutsumi | 75—108 X |
| 3,201,223 | 8/1965 | Cuhra et al. | 75—.5 A |

GEORGE T. OZAKI, Primary Examiner

U.S. Cl. X.R.

75—108, 118, 121, 134, 173